Feb. 24, 1959     W. S. BRINK     2,874,998
WHEEL CONSTRUCTION
Filed Nov. 20, 1953     3 Sheets-Sheet 1

INVENTOR.
WINFIELD S. BRINK
BY
W. A. Fraser
ATTY.

Feb. 24, 1959

W. S. BRINK 2,874,998

WHEEL CONSTRUCTION

Filed Nov. 20, 1953

INVENTOR.
WINFIELD S. BRINK
BY
W. A. Fraser
ATTY.

Feb. 24, 1959 W. S. BRINK 2,874,998
WHEEL CONSTRUCTION
Filed Nov. 20, 1953 3 Sheets-Sheet 3

INVENTOR.
WINFIELD S. BRINK
BY W. A. Fraser
ATTY

United States Patent Office 2,874,998
Patented Feb. 24, 1959

2,874,998

WHEEL CONSTRUCTION

Winfield S. Brink, Akron, Ohio, assignor to The Firestone Tire & Rubber Company, Akron, Ohio, a corporation of Ohio Application November 20, 1953, Serial No. 393,427

1 Claim. (Cl. 301—20)

This invention relates generally to a wheel construction in which the rim is removably secured to a disc portion by the chucking action of a plurality of clamp members and more particularly relates to an improved form of such clamp members.

Heretofore rims have been secured to the disc portion of wheels by clamp members which are moved outwardly to engage the rim by the reaction of wedge surfaces on the clamps and on the disc portion itself. As a result there is often a tendency for the wedging surfaces to become cocked or tilted at a slight angle with the result that the rim is secured in a position of misalignment with the axis of the wheel. The result is that the misaligned tire will wear severely and unevenly.

The present invention avoids this difficulty of misalignment which is inherent in the prior art structures by providing fixed radial surfaces which act as positive guides for the radially outward chucking movement of the clamping members. The construction of the members is such as to ride upon the fixed surfaces so that the members have no axial component of motion as they are brought into forcible contact with the rim. All of the clamping members remain aligned in a plane determined by the fixed radial surface and the possibility of misalignment of the rim is virtually eliminated.

An object of the invention, therefore, is to provide a wheel structure with positive means for aligning the rim with respect to the wheel.

Another object of the invention is to provide improved clamping members for engaging in securing a removable rim to a wheel structure.

Yet another object is to provide improved clamping members which are simple and easy to manufacture and convenient to use.

Another object is to provide an improved clamping member which is expandable radially by coacting wedging surfaces within the member itself independent of the rim and wheel.

Yet another object is to provide a single piece clamping member for securing a rim to a wheel structure.

These and further objects and advantages will be more fully apparent from the following description of a preferred and modified form of the invention, reference being had to the accompanying drawings in which.

Figure 1:
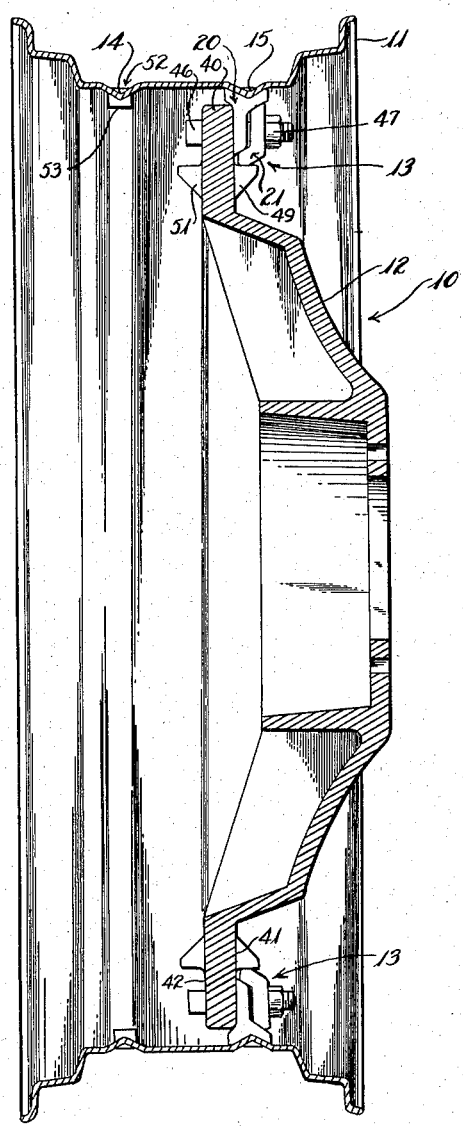
Figure 1 is a radial section of a wheel with a preferred form of clamping member for securing the rim to the wheel.
Figure 2:
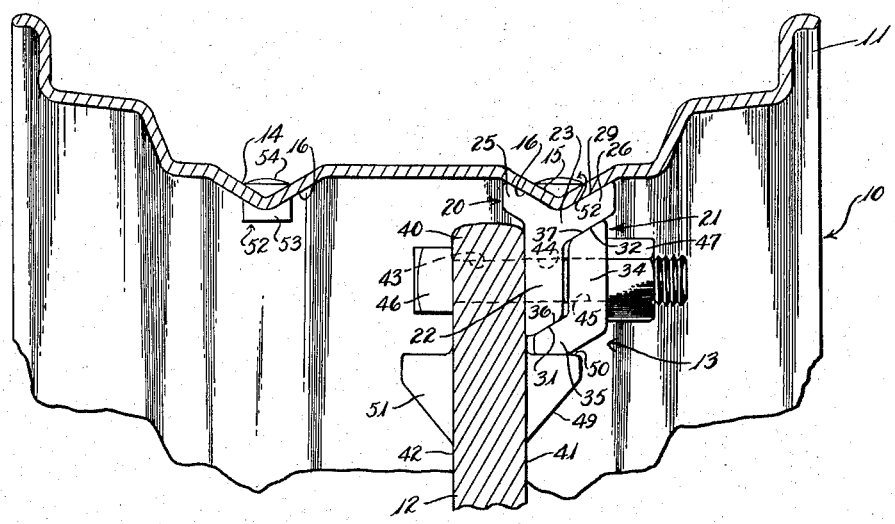
Figure 2 is a fragmentary section of a portion of Figure 1 showing on an enlarged scale the operation and function of the clamping members.
Figure 3:
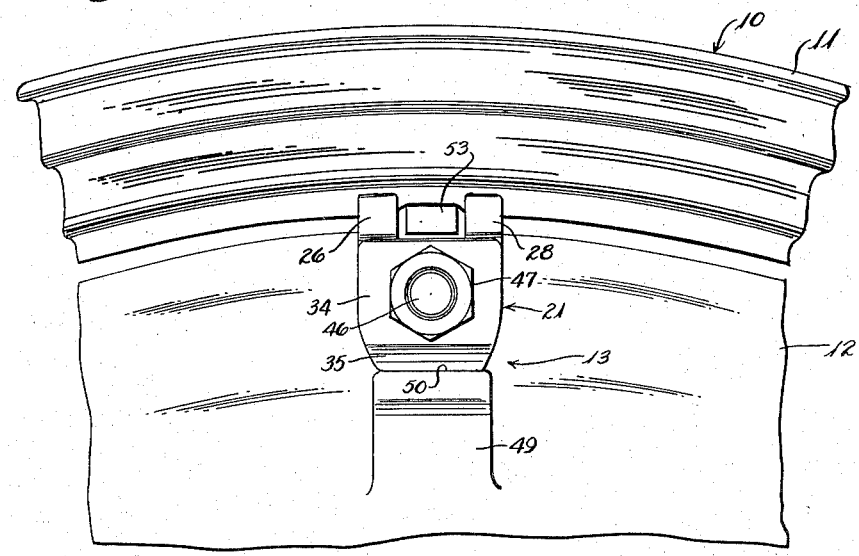
Figure 3 is a side elevation of the portion of the wheel illustrated in Figure 2.

As shown in Figure 1, the invention is adapted to be used in conjunction with a wheel structure indicated generally at 10 comprising a rim 11 which is secured to the disc portion 12 of the wheel by the chucking action of a plurality of clamp members indicated generally at 13 which are spaced circumferentially about the wheel. The rim 11 is a more or less conventional construction, having a drop center well which is provided with two circumferentially extending ribs 14 and 15 which project inwardly in a radial direction as shown in Figure 2 and which comprises the flat angular surfaces 16 as best seen in Figure 2. Usually two such ribs are provided in the rim so that a choice of wheel spacing can be obtained but a greater number may be used.

Figure 4:
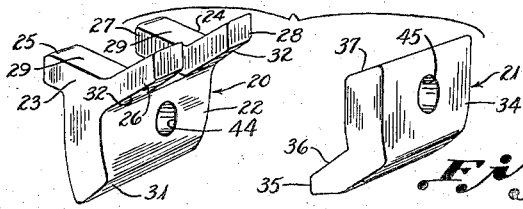
Figure 4 is a perspective view of the parts comprising the clamping member of Figures 1–3.

As best seen in Figure 4, the preferred form of clamping member comprises an assembly of a bifurcate chucking member 20 and a member 21 referred to hereafter as a wedge member. The chucking member 20 has a radially extending body part 22 terminating in two circumferentially spaced outwardly concave portions 23 and 24 which are defined by the pairs of projections 25 and 26 and 27 and 28 respectively, see Figure 4. The concave portions have angular flat surfaces 29 which are adapted to engage the corresponding surfaces 16 of either the rib 14 or the rib 15, whichever is used. The body part 22 extends inwardly from the arms to terminate in an angular plane surface 31 and the projections 26 and 28 have coplanar inner surfaces 32 which extend parallel to the plane 31. The surfaces 31 and 32 preferably lie at an angle of about 30° to 45° to the axis of the wheel and they function as cam surfaces with respect to the wedge member 21 as will be explained below.

Each web member 21 comprises a radially extending body portion 34 terminating in an angularly disposed foot portion 35 having a cam surface 36 adapted to coact with the cam surface 31 referred to above. The body portion also terminates in an upper cam surface 37 adapted to cooperate with the cam surface 32 of the chucking member. The surfaces 36 and 37 are necessarily parallel to each other and extend at the same angle to the axis of the wheel as the surfaces of the wheel 31 and 32.

The clamp members 13 are secured to and supported by a corresponding number of lug portions 40 spaced uniformly about the circumference of the wheel. The outer surfaces 41 of the lug portions lie in a common transverse plane and the inner surfaces 42 likewise are co-planar. The portions have axially drilled holes 43 and the chucking members and wedge members of the clamps have axial holes 44 and 45 respectively, permitting the clamps to be secured to the lug portions by bolts 46 and nuts 47, as best shown in Figure 2. It will be noted that, when the parts are in assembled position, the flat side of the body portion of each chucking member lies flat against the surfaces 41 and the coacting cam surfaces 31 and 36 and 32 and 37 engage each other respectively. The foot portion 35 of the wedge member is supported on a projection 49 integral with the portions 40 and that the supporting surface 50 of the projection is in a plane parallel to the axis of the wheel.

When a nut 47 is tightened upon its bolt 46 the wedge member 21 will be forced inwardly in an axial direction upon the projection 49 and in doing so it will force the chucking member 20 radially outwardly, by virtue of the coaction of the cam surfaces, into engagement with the rib 15 of the rim. The forces imposed upon each chucking member have two components; an axial component which forces the body 22 of the chucking member to lie flush against the surface 41 of the wheel portion 40, and a radial component which forces the chucking member outwardly to engage and grip the rim. Because the clamping member is positively forced into engagement with the plane surface 41, that surface will act as a guide for the outward movement of the chucking member and eliminate any possibility of misalignment between the wheel and the rim.

In order to obtain a variable wheel spacing it is possible to reverse the position of the clamping members and support them against the radial surfaces 42 on the inner side of the lug portions, the clamping members being supported by a cantilever projection 51 similar to the projection 49 already described. Likewise for either position of the clamping members, the rim may be shifted axially so that the members will clamp either the rib 14 or the ribs 15 as desired. Four possible wheel spacings are thus provided.

In order to prevent turning of the rim upon the wheel at least one and preferably two driving lugs indicated at 52 are secured to the rim in each of the ribs 14 and 15. The driving lugs comprise blocks 53 of metal which are riveted as at 54 to the rim and which extend inwardly to fit snugly between the projections 25, 26, 27 and 28 of two of the clamping members. The driving lugs thus key the rim to the wheel and secure the rim against slippage. Usually eight clamping members are used to hold the rim and preferably one or two of these clamping members will be cast in the form of a solid piece, omitting the relative movement and the camming action between the chucking and wedge members, and these solid members are employed to engage the driving lugs. If two solid chucking members are used they are necessarily located adjacent each other rather than spaced diametrically opposite so that the rim can be initially placed within the clamping members.

Figure 5:
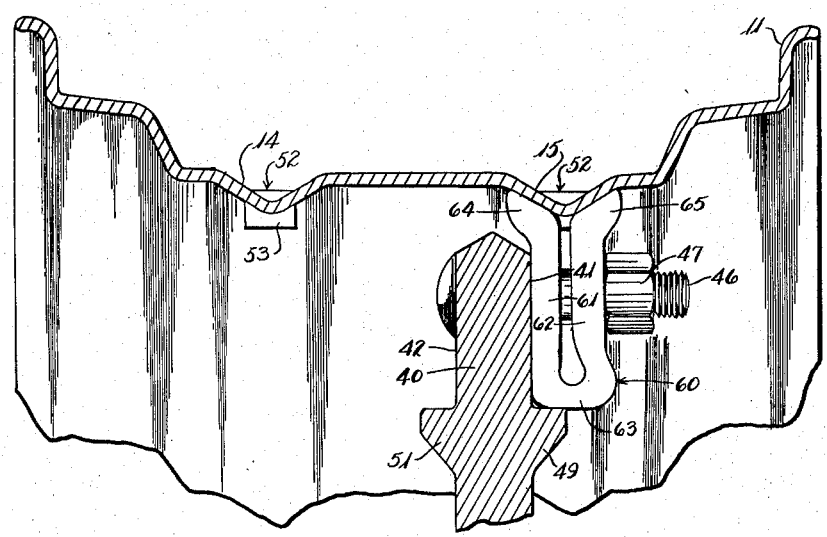
Figure 5 is a view similar to Figure 2 showing another form of clamping member.
Figure 6:
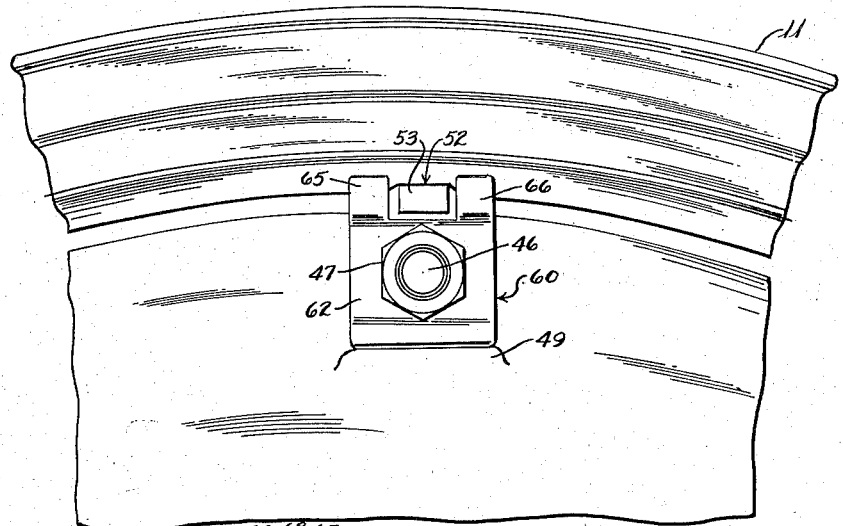
Figure 6 is a view similar to Figure 3 showing the wheel structure and clamping member of Figure 4 in side elevation.
Figure 7:
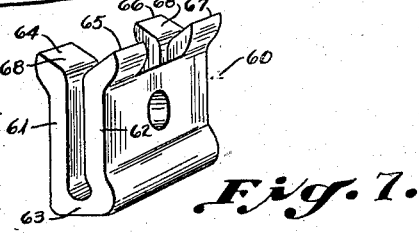
Figure 7 is a perspective view of the parts comprising the clamping member of Figures 5 and 6.

A modified form of the invention as shown in Figures 5, 6 and 7 comprises a substantial U-shaped member 60 having a pair of rigid spaced arms 61 and 62 connected by a bottom web portion 63. The arms terminate in circumferentially spaced pairs of projections 64, 65, 66 and 67 having angular flat surfaces 68 which, like the surfaces 29 of the members 13 are adapted to engage and clamp the surfaces 16 of the ribs 14 and 15.

The U-shaped member is adapted to be secured to the lug portions 40 of the wheel by bolts 46 and nuts 47 in a manner similar to that described above with respect to the clamp members 13. It will be noted that when a clamp is so mounted, as in Figure 5, the flat side of the arm 61 lies flush against the surface 41 of the portion 40 and the web portion 63 is supported on the projection 49. When the nut 47 is tightened upon the bolt, the arm 62 will be forced inwardly and in doing so the projections 65 and 67 will move in an arcuate path having a radial component of motion which causes the angular surfaces to move outwardly into forcible engagement with the rib 14. The rib 15 is, in this manner, securely clamped between the angular surfaces of the two arms of the clamping member. The resilience of the clamping member causes the arm 61 to remain in contact with the surface 41 so that there is no possibility of the member or the rim becoming misaligned.

In assembling the parts in the position of Figure 5, the U-shaped clamping members are initially in relaxed position so that the arms assume a slight angle as shown in Figure 7. With the clamps in this position it is possible to bring the arms 61 against the surfaces 41 and in contact with the rib 15, the arms 62 being bent radially inwardly enough to permit this to be accomplished. Thereafter when the nuts 47 are tightened upon the bolts 46, the arms 62 will move inwardly to affect the desired clamping engagement.

Like the clamping members 13, it is possible to reverse the position of the U-shaped members 60 and support them on opposite sides of the lug portions 40 and use them with either of the ribs 14 or 15 as desired. Likewise, the driving lugs 52 are adapted to lie between the arm projections 64—67 to secure the rim against slippage.

Various modifications and changes will occur to those skilled in the art without departing from the spirit and scope of the invention, the essential features of which are summarized in the claim below.

I claim:

A clamp adapted for use in a wheel structure wherein a rim is secured to said wheel by the chucking action of a plurality of such clamps, said clamp comprising a chucking member having a pair of circumferentially spaced forked portions having oppositely disposed surfaces forming radially outward concave areas, said areas being adapted to engage complementary surfaces on the inner periphery of said rim, said chucking member having a radial surface adapted to seat against a fixed, radial, supporting surface on said wheel, and also having a pair of radially spaced, substantially parallel cam surfaces, and a wedging member cooperating with said chucking member, said wedging member having a pair of radially spaced cam surfaces adapted to engage said first mentioned cam surfaces, a bolt passing through said wheel and said members and a nut holding said members and wheel in assembled position whereby when said nut is tightened said wedging member is moved axially toward said chucking member to force said chucking member radially outwardly along said supporting surface and to bring said forked portions into forcible engagement with said rim.

References Cited in the file of this patent

UNITED STATES PATENTS

| 1,698,534 | Broxon | Jan. 8, 1929 |
| 1,846,064 | Nelson | Feb. 23, 1932 |
| 2,162,696 | Burger | June 20, 1939 |
| 2,171,170 | Beckman | Aug. 29, 1939 |
| 2,254,361 | Frudden | Sept. 2, 1941 |
| 2,633,388 | Woodward | Mar. 31, 1953 |

FOREIGN PATENTS

| 638,262 | France | Feb. 14, 1928 |